(12) United States Patent
Hitzel et al.

(10) Patent No.: US 8,840,196 B2
(45) Date of Patent: Sep. 23, 2014

(54) BRAKE SYSTEM FOR A MOTOR VEHICLE

(75) Inventors: Michael Hitzel, Rödermark (DE);
Michael Jung, Limburg (DE);
Bernhard Hauke, Hochheim (DE);
Ronald Kley, Seligenstadt (DE); Stefan A. Schmitt, Johannesberg (DE)

(73) Assignee: Continental Teves AG & Co. oHG (DE)

( * ) Notice: Subject to any disclaimer, the term of this patent is extended or adjusted under 35 U.S.C. 154(b) by 342 days.

(21) Appl. No.: 12/676,775

(22) PCT Filed: Sep. 3, 2008

(86) PCT No.: PCT/EP2008/061623
§ 371 (c)(1),
(2), (4) Date: Mar. 5, 2010

(87) PCT Pub. No.: WO2009/030707
PCT Pub. Date: Mar. 12, 2009

(65) Prior Publication Data
US 2010/0206673 A1    Aug. 19, 2010

(30) Foreign Application Priority Data

| Sep. 5, 2007 | (DE) | 10 2007 042 202 |
| Sep. 5, 2007 | (DE) | 10 2007 042 204 |
| Aug. 27, 2008 | (DE) | 10 2008 039 960 |

(51) Int. Cl.
*B60T 13/16* (2006.01)
*B60T 8/26* (2006.01)
*B60T 8/40* (2006.01)
*B60T 8/48* (2006.01)
*B60L 7/24* (2006.01)

(52) U.S. Cl.
CPC ............... *B60T 8/267* (2013.01); *B60T 8/4072* (2013.01); *B60T 8/4881* (2013.01); *B60L 7/24* (2013.01)
USPC ............ 303/10; 60/585; 303/116.1; 303/151; 303/3

(58) Field of Classification Search
None
See application file for complete search history.

(56) References Cited

U.S. PATENT DOCUMENTS

| 3,696,958 | A | * | 10/1972 | Lee | 215/261 |
| 4,506,507 | A | * | 3/1985 | Wimbush | 60/584 |
| 4,630,443 | A | * | 12/1986 | Steer | 60/535 |
| 4,964,681 | A | * | 10/1990 | Burgdorf et al. | 303/115.4 |
| 5,217,284 | A | | 6/1993 | Willmann | |
| 5,282,676 | A | * | 2/1994 | Takeda et al. | 303/113.2 |
| 5,282,677 | A | * | 2/1994 | Luetteke | 303/116.2 |
| 5,401,084 | A | * | 3/1995 | Volz | 303/113.2 |
| 5,427,152 | A | | 6/1995 | Weber | |

(Continued)

FOREIGN PATENT DOCUMENTS

| DE | 4131524 A1 | 4/1993 |
| DE | 4202905 A1 | 8/1993 |

(Continued)

*Primary Examiner* — Thomas Irvin
(74) *Attorney, Agent, or Firm* — RatnerPrestia

(57) ABSTRACT

A brake system for a motor vehicle which simplifies the hydraulic design and avoids a vacuum prevailing over a relatively long period of time. The first hydraulic unit has a suction volume, which is connected to the suction side of the pump and which, in the event of a change in the pressure on the suction side of the pump, provides a pressure and volume equalization by means of the brake fluid stored in the suction volume, with an elastic element.

10 Claims, 3 Drawing Sheets

(56) References Cited

U.S. PATENT DOCUMENTS

| | | | |
|---|---|---|---|
| 5,769,509 A * | 6/1998 | Feigel et al. ................. 303/152 |
| 5,853,229 A | 12/1998 | Willmann et al. |
| 5,927,827 A * | 7/1999 | Reuter et al. ............. 303/116.2 |
| 6,079,799 A * | 6/2000 | Sawada et al. ................ 303/146 |
| 6,178,747 B1 * | 1/2001 | Tang ............................... 60/585 |
| 6,189,572 B1 | 2/2001 | Rüffer et al. |
| 6,360,540 B1 * | 3/2002 | Kottmyer ........................ 60/585 |
| 6,363,719 B2 * | 4/2002 | Mohr et al. ...................... 60/414 |
| 6,494,547 B2 * | 12/2002 | Higashimura et al. ........ 303/152 |
| 6,554,372 B1 * | 4/2003 | Mackiewicz et al. ........... 303/11 |
| 6,991,303 B2 * | 1/2006 | Woll .......................... 303/116.2 |
| 8,123,310 B2 * | 2/2012 | Haupt et al. .................. 303/152 |
| 2001/0002236 A1 | 5/2001 | Mohr et al. |
| 2002/0011750 A1 | 1/2002 | Higashimura et al. |
| 2007/0296264 A1 | 12/2007 | Haupt et al. |

FOREIGN PATENT DOCUMENTS

| | | |
|---|---|---|
| DE | 19604134 A1 | 8/1997 |
| DE | 19706427 A1 | 8/1998 |
| DE | 19833410 A1 | 2/2000 |
| DE | 60105353 T2 | 2/2005 |
| DE | 102007036859 A1 | 4/2008 |
| EP | 0459117 A1 | 12/1991 |
| EP | 0539898 A1 | 5/1993 |
| EP | 0668199 A1 | 8/1995 |
| GB | 2263753 | 8/1993 |
| WO | WO9520511 A1 | 8/1995 |
| WO | WO2004/101308 A1 | 11/2004 |
| WO | WO2008017726 A1 | 2/2008 |

\* cited by examiner

BRAKE SYSTEM FOR A MOTOR VEHICLE

CROSS REFERENCE TO RELATED APPLICATIONS

This application is the U.S. national phase application of PCT International Application No. PCT/EP2008/061623, filed Sep. 3, 2008, which claims priority to German Patent Application No. 102007042204.2, filed Sep. 5, 2007, German Patent Application No. 102007042202.6, filed Sep. 5, 2007 and German Patent Application No. 102008039960.4, filed Aug. 27, 2008, the contents to such applications being incorporated by reference herein.

BACKGROUND OF THE INVENTION

The present invention relates to a brake system for a motor vehicle which has a brake pressure-generating means, with or without power-assistance, with a non-pressurized storage reservoir, the brake pressure-generating means being connected to a human-machine interface, which by way of a brake fluid serves for generating hydraulic brake pressure for brake devices, preferably friction brakes, the brake system providing at least a first hydraulic unit for connecting the brake pressure-generating means to the brake devices of at least one axle and for transmitting the hydraulic brake pressure through the brake fluid, the first hydraulic unit being electro-hydraulically controllable and capable of operation independently of the brake pressure generated by the brake pressure-generating means, and having a pump with a high-pressure side and a suction side.

The brake system specified above is often used for motor vehicles which besides an internal combustion engine also have an electric motor for drive purposes (hybrid drive). The electric motor here can also be used as generator for obtaining electrical energy (recuperation), a braking force generated by the generator being applied during the recuperation to at least one axle of the motor vehicle, preferably the rear axle.

The purpose of such regenerative brake systems in motor vehicles is to store at least a proportion of the energy applied in braking in a battery and to reuse this for driving the vehicle. This serves to reduce the overall energy consumption of the motor vehicle, to increase the efficiency and thereby to make operation more economic.

WO 2004/101308 A1, which is incorporated by reference, discloses a regenerative brake system for motor vehicles, in which the electrically regenerative brake (generator brake) in the ranges to which it is suited is used in parallel with the hydraulic friction brakes. In such working operation of the electrically regenerative brake, however, the pressure consumption balance of the brake fluid of the friction brakes is often upset because, when account is taken of the deceleration achieved, the brake pressure of the friction brakes applied by the brake pressure-generating means is reduced to a lesser extent than in a purely conventional braking with friction brakes, since the electrically regenerative brake does not reduce the brake fluid pressure or in operation does not take up any volume of brake fluid. For this reason, in the known system for braking with an electrically regenerative brake, brake fluid is diverted into a pressure accumulator, which is preferably embodied as a low-pressure accumulator, in order thereby to simulate an additional braking of the friction brake. In this way the pressure of the brake fluid or the pressure volume is reduced, which in turn has an effect on the brake pressure-generating means (brake pedal). A comfortable braking sensation is thereby achieved.

DE 10 2007 036 859 A1, which is incorporated by reference, discloses a brake system in which an isolating valve, which is of a type that remains open in the absence of a current, is arranged between the tandem master cylinder and the inlet valve of the friction brakes on the axle with recuperative braking. This isolating valve on the one hand cuts off the hydraulic connection to the tandem master cylinder and on the other, in the currentless emergency state, allows a direct hydraulic-mechanical action on the associated friction brakes. The signal for closure of the isolating valve is generated by the detection of driver braking. Isolating the brake pressure-generating means and the friction brake and/or hydraulic unit makes it possible to control the brake device of the corresponding axle on by-wire principles (brake-by-wire, electromechanical control). A pump, which supplies the necessary system pressure, is provided in the by-wire brake circuit.

A direct hydraulic action on both axles of the vehicle is generally afforded in the event of a failure of the electronic control of the hydraulic brake circuit, so that a maximum utilizable deceleration is achieved on road surfaces with a low coefficient of friction, since all wheels are capable of transmitting braking force up to the limit of grip.

In order to isolate the hydraulic unit from the brake pressure-generating device, the isolating valve of the known brake system is energized and is thereby closed from the time braking is detected until the driver ceases to brake. Between the individual braking operations the valve ensures volume and pressure equalization via the tandem master cylinder reservoir.

In order to achieve a dynamic pressure build-up during the by-wire control, the known system moreover comprises a converter, which is arranged in parallel with the pump and has two chambers, that is to say an inlet-side control chamber and an outlet-side supply chamber, which are separated from one another by a moveable, spring-biased piston. The converter supplies the pump on the suction side with an inlet pressure, which ensures a good supply of brake fluid at the required pressure, even at low temperatures, and regulates this. The hydraulic volume and transmission ratio of the converter is here selected so that there is sufficient priming pressure and intake volume available for the pump.

The known system with such a converter has the disadvantage, however, that it is costly to manufacture. Moreover, in terms of the response time it does not yet satisfy the stipulated requirements, since the priming occurs only with a delay. The known system furthermore has the disadvantage that the priming causes a loss of delivery capacity, since the volume delivered into the volume accumulator for the priming cannot be used for building up brake pressure.

SUMMARY OF THE INVENTION

An object of the present invention, is to create a brake system which, without unwanted volume losses for priming, under all ambient conditions ensures an adequate volume supply to the pump and which satisfies the requirements in terms of response time and manufacturing costs.

The aforementioned object is achieved by a brake system, in which the first hydraulic unit, which may be operated by wire, has a suction volume, which is connected to the suction side of the pump and which, in the event of a change in the pressure on the suction side of the pump, provides a pressure and volume equalization by way of the brake fluid stored in the suction volume, together with an elastic element.

The brake system according to at least one aspect of the invention has the advantage that it leads to a hydraulic simplification and hence to more cost-effective manufacture of the brake system, since the converter described above can be dispensed with. The low-pressure accumulator in this hydraulic unit can moreover also be dispensed with. The brake system according to at least one aspect of the invention moreover means that a detrimental negative pressure in the brake fluid is equalized by the storage of the brake fluid provided in the suction volume. The flexible storage by way of the elastic element allows an immediate equalization of pressure immediately following the change in volume on the pump suction side under the effect of the elasticity of the elastic element. The elastic element is preferably arranged in the wall or formed as a section of the wall of the suction volume, adjoining which is an equalization volume. In the event of a volume change in the suction volume the elastic element is correspondingly deflected elastically, producing a change in the volume of the brake fluid chamber and accordingly in the equalization volume. This serves on the one hand to compensate rapidly for the change in volume and pressure and means that a functionally detrimental negative pressure over a prolonged period of time, which would lead to the escape of air dissolved in the hydraulic fluid, is not generated in the first place. The deflection of the elastic element then leads to an equalization of the volume and pressure via the equalization volume.

In a preferred exemplary embodiment the suction volume is located in direct proximity to the suction side of the pump. The bore of the suction duct should advantageously be situated no further away than 100 mm from the suction side of the pump. This has the advantage that a very good response behavior is achieved, since, in the event of a change in pressure towards the build-up of a negative pressure, pressure can be equalized through the suction volume without the displacement of considerable volumes of brake fluid. In such a system the fluid friction generated in volume extraction is low.

It is furthermore preferred if the elastic element moves with minimal friction during the admission or delivery of the brake fluid. It is advantageous here if the hysteresis in the pressure caused by the friction does not exceed 100 mbar. This also leads to a very good response behavior and an efficient equalization even of very small negative pressures. A minimum possible friction thereby has an especially positive effect on the response behavior, since under an incipient deflection of the elastic element the forces generated by the friction represent an especially high proportion of the forces acting in opposition to the deflection of the elastic element.

Such a suction volume of an elastic element moving with minimal friction is preferably formed by a bellows accumulator, preferably a metal bellows accumulator, which preferably stores brake fluid in a pump-side chamber and delivers ambient air into an equalization chamber or evacuates it therefrom in order to compensate for the pressure differential produced by the brake fluid withdrawn or admitted. Alternatively the suction volume may be formed by a piston accumulator, which likewise stores brake fluid in the pump-side chamber and is capable of delivering ambient air into an equalization chamber or evacuating it therefrom by way of pressure equalization. The elastic element of the bellows accumulator is provided by a bellows, whilst the elastic element of the piston accumulator is formed by a piston braced by a spring. The pump-side chamber and the equalization chamber are at least partially divided by the bellows. No mixing of the ambient air and the brake fluid occurs.

Further suction volumes with an elastic element moving with little friction are also feasible. A suction volume of somewhat more elaborate design is afforded by a bladder accumulator having a rubber bladder, which is of multilayer design. A metal layer is preferably provided in the multilayer composite of the rubber bladder, in order to counteract any gas diffusion.

In a further preferred exemplary embodiment the suction volume is formed by a brake fluid reservoir. As elastic element the brake fluid reservoir has a diaphragm, which takes the form of an EPDM (ethylene-propylene-diene rubber membrane) diaphragm, a metal bellows or a similar diaphragm composed of an elastic material. The advantage of the diaphragm or another elastic element is that at the start of the pressure build-up the pump can at first be supplied 100% from the volume of the deflection of the diaphragm or the elastic element.

In a preferred exemplary embodiment the brake fluid reservoir is connected to the storage reservoir by way of a communicating connecting line, preferably by way of a hose, a plastic line and/or a pipeline having a larger inside diameter than the inside diameter of the other hydraulic lines of the first hydraulic unit. The inside diameter used in achieving this preferred embodiment basically depends on the individual length of the connecting line and the installed delivery capacity of the pump. For example, an inside diameter of the connecting line of at least 8 mm may be used, which is sufficient for a majority of applications. The advantage of such an embodiment is that, owing to the large inside diameter of the communicating connecting line to the brake fluid reservoir, in the event of pressure changes a correspondingly large volumetric flow of brake fluid is very rapidly available to compensate for a negative pressure. Depending on the configuration of the suction volume, a continuous transfer to the supply emanating from the storage reservoir can then occur in the course of the pressure build-up.

The brake system according to at least one aspect of the invention may be of particularly compact design if the suction volume is at least partially integrated into the hydraulic control unit (HCU) formed from the at least one hydraulic unit.

In a preferred exemplary embodiment an analog pressure regulating valve, which is capable of adjusting the system pressure continuously and therefore modulating the pressure to suit the brake devices in the recuperation phases, is provided in parallel with the pump between the brake device side of the isolating valve and the suction volume. The controllable system pressure valve allows the requisite system pressure to be purposely provided in all braking situations with or without braking on the part of the driver.

Further features, advantages and possible applications of the present invention are set forth in the following description of exemplary embodiments of brake systems according to at least one aspect of the invention, with reference to figures. Whether in isolation or in any combination, all features described and/or graphically represented here form the subject matter of the present invention, regardless of their recapitulation in the claims or the related claims.

BRIEF DESCRIPTION OF THE DRAWINGS

The invention is best understood from the following detailed description when read in connection with the accompanying drawings. Included in the drawings are the following features.

In all figures the same constituent parts of the brake system are provided with the same reference numerals.

DETAILED DESCRIPTION OF THE PREFERRED EMBODIMENTS

Figure 1:
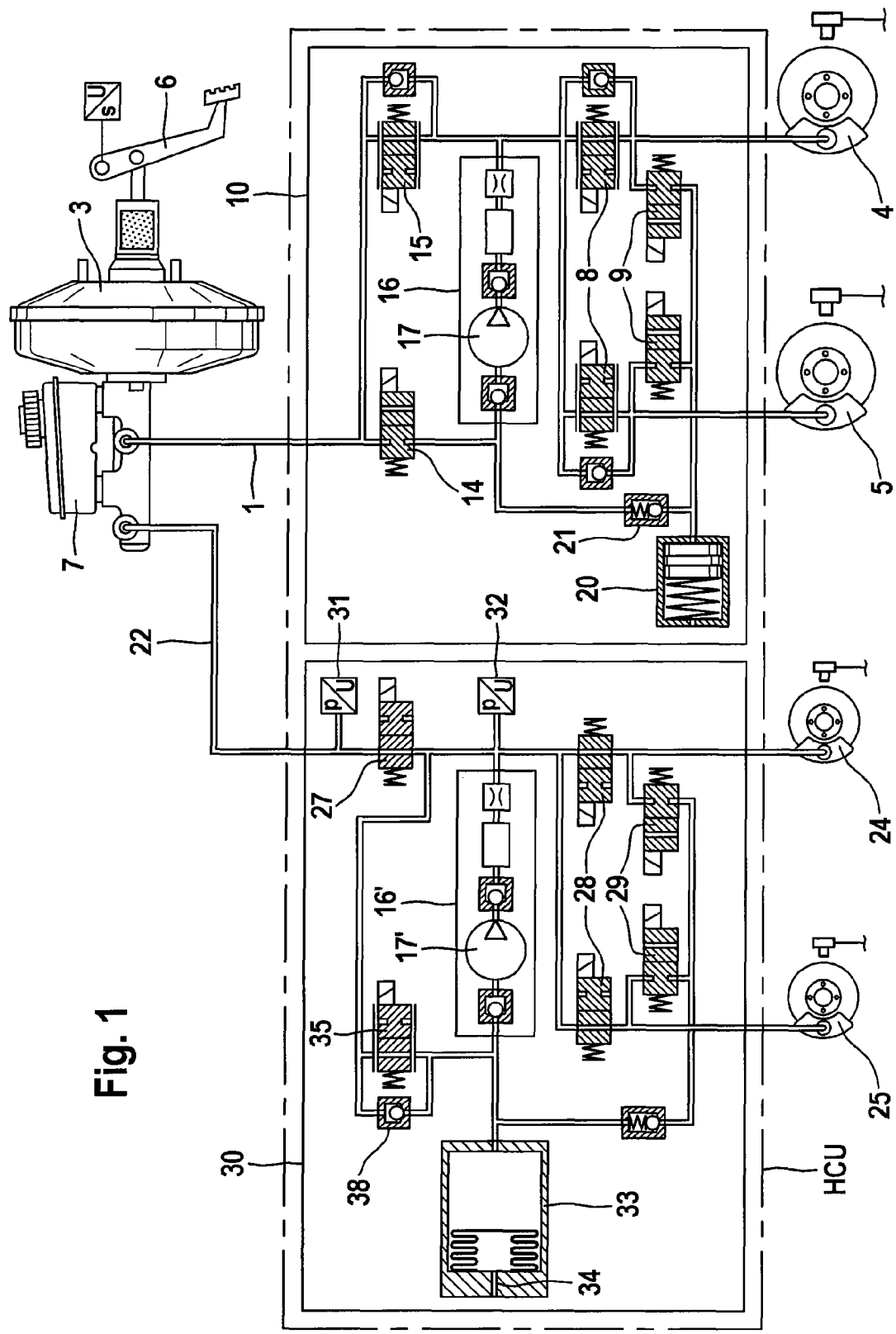
FIG. 1 shows a schematic circuit diagram of a first exemplary embodiment of a brake system according to aspects of the invention.

The brake system shown in FIG. 1 is a brake system which in addition to four friction brakes 4, 5, 24, 25 also comprises an electrical alternator (not shown) for generating electrical energy and as a regenerative brake. The brake system is preferably designed so that a maximum possible brake torque will be applied via the electrical alternator, in order to achieve a high motor vehicle efficiency. Alternatively, instead of an alternator a flywheel mass accumulator or a hydraulic converter with hydraulic accumulator may be provided, which convert kinetic energy into potential energy in order to reuse this later to drive the motor vehicle.

The brake system is provided with a brake booster, which is designed as a tandem master cylinder 3, preferably power-assisted. The brake pressure applied by the tandem master cylinder 3 is transmitted to the friction brakes 4, 5, 24, 25 by a brake fluid via hydraulic lines 1, 22 and the hydraulic units 10 and 30. The hydraulic unit 10 acts on the friction brakes 4, 5 of the first axle, which preferably constitutes the front axle. The hydraulic unit 30 is connected to the friction brakes 24, 25 of the second axle, preferably the rear axle. The two hydraulic units 10, 30 together form the HCU assembly.

In the brake system according to aspects of the invention a brake pedal 6, which is connected to the tandem master cylinder 3, is also provided as human-machine interface. The brake pedal 6 serves for adjustment of the required braking force by the driver of the motor vehicle. The tandem master cylinder 3 further comprises a non-pressurized brake fluid storage reservoir 7, which is connected to the master cylinder 3.

The hydraulic unit 10, which is connected to the tandem master cylinder 3 by the hydraulic lines 1 and which constitutes a conventional ESP brake circuit, is generally operated independently of the regenerative brake. The hydraulic unit 10 comprises pressure modulation valves 8, 9 (inlet valve 8, outlet valve 9), which when the brake is actuated by the driver by way of the brake pedal 6 regulate the brake pressure in the wheel brakes 4, 5 as a function of the brake slip values prevailing at any given time. A change-over valve 14, which is closed in the basic position and which forms the connection to a pump and damping unit 16 comprising a pump 17 for traction control and vehicle dynamics control, is also provided. An isolating valve 15 is furthermore provided, which is open in the absence of a current and which during traction control or control of the vehicle dynamics prevents an unwanted return flow of the hydraulic fluid into the tandem master cylinder 6 and ensures that the hydraulic fluid passes from the pump 17 via the pressure modulation valves 8, 9 exclusively to the wheel brakes 4, 5.

The brake system also comprises a low-pressure accumulator 20, which is assigned to the outlet side of each outlet valve 9 and is connected to the suction side of the pump 17 via a non-return valve 21 in each case situated between the electrical change-over valve 14 and the pump 17. The inlet valves 8 are embodied as pressure modulation valves, which in the basic position are open in the absence of an electromagnetic current, and the outlet valves 9 as pressure modulation valves, which in the basic position are closed in the absence of an electromagnetic current. In order to refine the pressure modulation and to reduce the valve noise, the pressure modulation valve 8 is in each case analog-controlled, in contrast to the binary-controlled pressure modulation valve 9.

The second hydraulic unit 30 is connected to the tandem master cylinder 3 and the friction brakes 24, 25 by hydraulic lines 22. In recuperation mode this brake circuit is electronically controlled (by-wire) and, if necessary, operated in parallel with the regenerative brake preferably embodied as a recuperation brake, in order to afford additional braking force on the friction brakes 24, 25. Furthermore, in the event of a defect, that is to say in the event of a failure of the electronic control, the brake system with the hydraulic unit 30 can be operated through direct hydraulic action via the tandem master cylinder 3.

In order to interrupt the connection to the tandem master cylinder 3 for the electronic control (not shown) of the hydraulic unit 30, an isolating valve 27 is provided, which is of a type that remains open in the absence of a current. The isolating valve 27 is located between the tandem master cylinder 3 and the high-pressure side of a pump and damping unit 16' or the high pressure side of the electronically controlled pump 17' belonging to the pump and damping unit 16'. It is closed as soon as the driver actuates the brake pedal 6. The hydraulic unit 30, electronically controlled, then automatically assumes control of the braking force of the rear axle. The pump 17' here delivers hydraulic fluid for generating the additional brake torque on the friction brakes 24, 25.

The changes in pressure between the tandem master cylinder 3 and the isolating valve 27 and on the high-pressure side of the pump 17' are registered by pressure sensors 31, 32. On its high-pressure side the pump 17' is connected to the inlet valves 28 which are embodied as pressure modulation valves and are open in the absence of an electromagnetic current. The inlet valves 28 are of binary-controlled design. Outlet valves 29 embodied as pressure modulation valves are moreover provided between the friction brakes 24, 25 and a non-return valve 31. The outlet valves 29 are advantageously of a type which in the basic position are closed in the absence of an electromagnetic current.

In order to compensate for a negative pressure, a metal bellows accumulator 33, which comprises a suction volume containing the stored brake fluid, is provided on the suction side of the pump 17'. Also provided and separated from the former is a chamber containing ambient air, which serves for pressure equalization for the brake fluid evacuated or admitted. For admission or release of the ambient air, the metal bellows accumulator 33 has an aperture 34 for the ambient air. An analog-controlled pressure regulating valve 35, which is of a type that remains open in the absence of a current, is provided in parallel with the pump and damping unit 16' or the pump 17', between the suction side of the pump 17' and the sides of the isolating valve 27 facing the friction brakes 24, 25.

In normal operation the isolating valve 27 is closed immediately on the detection of driver braking, so that the brake circuit comprising the hydraulic unit 30 can be electronically controlled. The control is performed via the pump 17' of the pump and damping unit 16', so that a braking force can be provided via the friction brakes 24, 25 as a function of the operating state and the braking behavior of the regenerative brake. The brake pressure prevailing on the friction brakes 24, 25 is also controlled by the analog-controlled regulating valve 35 and the outlet valves 28.

If a volume is withdrawn from the suction side of the pump 17' and a negative pressure is correspondingly built up, the volume or the pressure withdrawn is immediately equalized by the metal bellows accumulator 33, which via the aperture 34 draws in ambient air from the surroundings, and in which the bellows is correspondingly deformed by the negative pressure. The metal bellows accumulator 33 is preferably arranged spatially in proximity to the suction side of the pump 17'.

Figure 2:
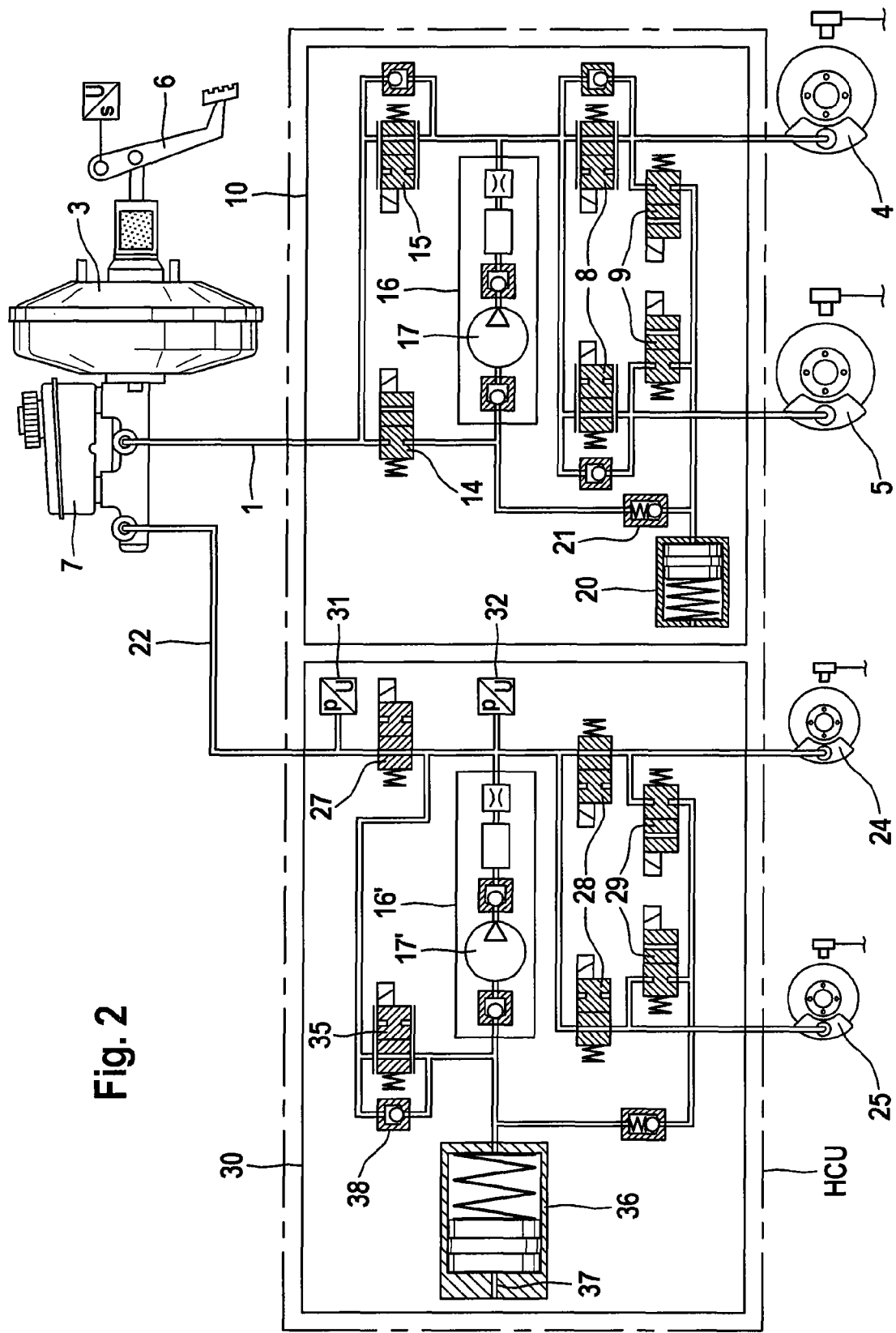
FIG. 2 shows a schematic circuit diagram of a second exemplary embodiment of a brake system according to aspects of the invention.

The brake system according to aspects of the invention represented in FIG. 2 is of similar design to the brake system represented in FIG. 1. Instead of the metal bellows accumulator, however, a piston accumulator 36 is provided, in which causes a displacement of the piston in order to compensate for volume withdrawal and resulting negative pressure on the suction side of the pump 17'. The displacement of the piston leads to the intake of air from the surroundings via an aperture 37.

The brake systems according to aspects of the invention represented in FIGS. 1 and 2 furthermore comprise a non-return valve 38, which is arranged in parallel with the analog-controlled regulating valve 35 and which ensures an equalization of pressure between the respective suction volumes 33, 36 and the side of the isolating valve 27 facing the friction brakes 24, 25, when an excess pressure prevails on the side of the suction volume 33, 36.

Figure 3:
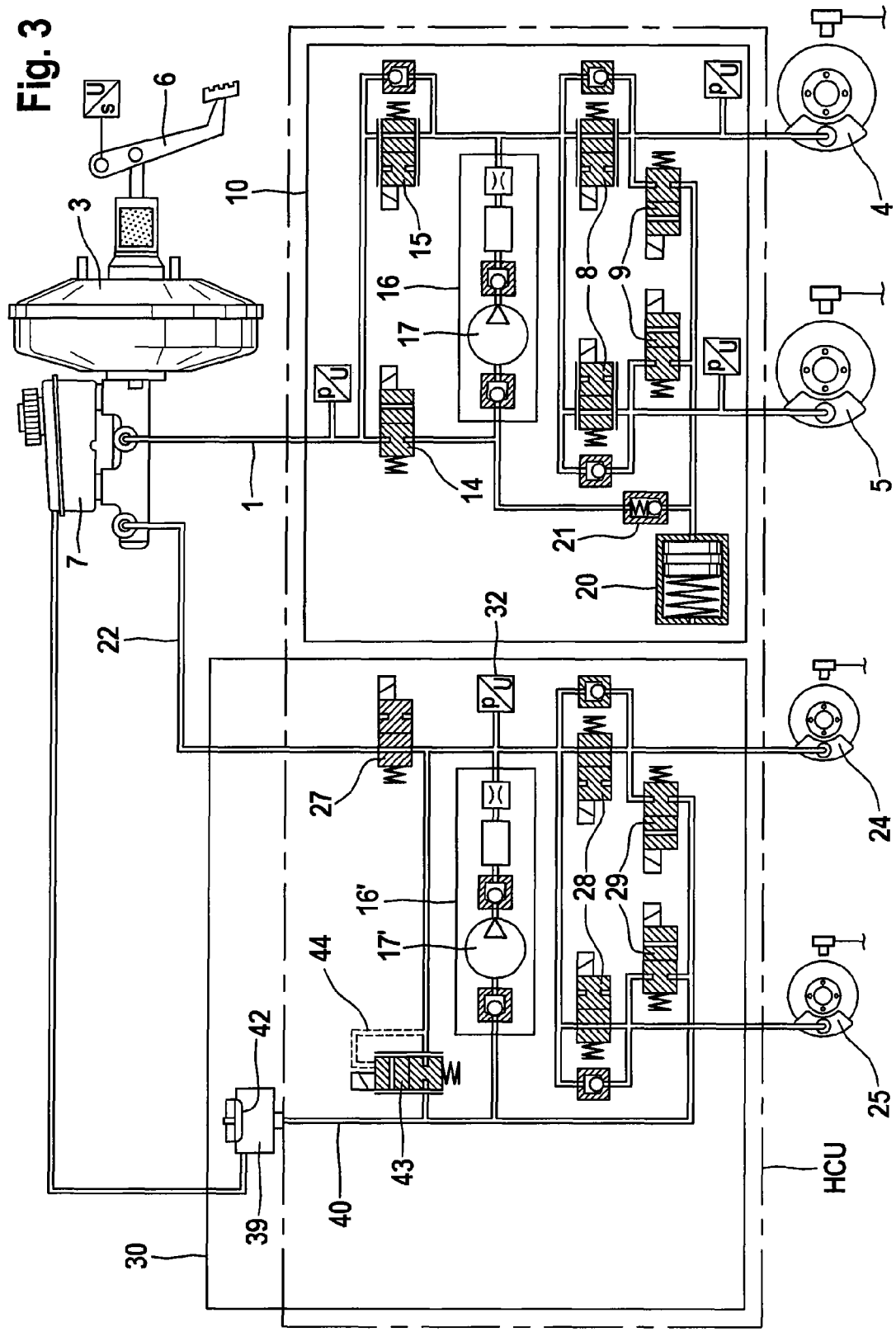
FIG. 3 shows a schematic circuit diagram of a third exemplary embodiment of a brake system according to aspects of the invention.

As suction volume the brake system according to aspects of the invention represented in FIG. 3 comprises a brake fluid reservoir 39, which is connected to the suction side of the pump 17' by a connecting line 40. The brake fluid reservoir 39 is also connected by a connecting line 41 to the reservoir 7 of the tandem master cylinder 3. The hydraulic fluid reservoir 39 furthermore comprises a diaphragm 42 as elastic element.

If a volume is withdrawn on the suction side of the pump 17' and a negative pressure is formed, this is immediately equalized by the brake fluid provided in the connecting line 41 and by a deformation of the diaphragm 42. For this purpose the connecting lines 40 and 41 have a larger inside diameter than the other hydraulic lines of the hydraulic unit 30, preferably of more than 8 mm, and preferably take the form of a hose, a plastic line and/or a pipeline. This affords an especially large volume on the suction side of the pump 17', so that if a negative pressure is formed a large volume is immediately available.

An analog-controlled regulating valve 43, preferably a PSG valve (proportional valve closed in the absence of a current), which is of a type closed in the absence of a current and which has control pressure venting 44, is located between the hydraulic fluid reservoir 39 and the isolating valve 27 (brake fluid side) in parallel with the pump 17'. The regulating valve 43 serves for continuous regulation of the pressure in the hydraulic unit 30.

Due to the hydraulic fluid stored in direct proximity to the pump and to the associated short transmission paths with few acceleration and friction losses, even at low temperatures, the brake systems according to aspects of the invention allow a sufficiently large volumetric flow to permit dynamic driving maneuvers and to fulfill the dynamic requirements in 'by-wire' systems.

The invention claimed is:

1. A brake system for a motor vehicle comprising:
a brake pressure-generating means, with or without power-assistance, with a non-pressurized storage reservoir, wherein the brake pressure-generating means is connected to a human-machine interface, which by way of a brake fluid serves for generating hydraulic brake pressure for brake devices;
a first hydraulic unit for connecting the brake pressure-generating means to the brake devices of a first axle, which is equipped with an electric motor, and for transmitting the hydraulic brake pressure through the brake fluid, wherein the first hydraulic unit is electro-hydraulically controllable and operable independently of the brake pressure generated by the brake pressure-generating means; and
a second hydraulic unit for connecting the brake pressure-generating means to the brake devices of a second axle, and for transmitting the hydraulic pressure through the brake fluid;
a pump with a high-pressure side and a suction side,
wherein the first hydraulic unit comprises a suction volume, which is connected to the suction side of the pump and which, in an event of a change in the pressure on the suction side of the pump and by way of the brake fluid stored in the suction volume, together with an elastic element, creates a first compensation for a negative pressure resulting from the change in the pressure on the suction side of the pump,
wherein the suction volume is uninterruptedly connected to the storage reservoir by way of a communicating connecting line, wherein a subsequent compensation created by the storage reservoir occurs over a time period longer than the first compensation created by the suction volume and the elastic element; and
wherein a brake fluid reservoir is provided as the suction volume, and the brake fluid reservoir comprises the elastic element.

2. The brake system as claimed in claim 1, wherein the brake devices are friction brake devices.

3. The brake system as claimed in claim 1, wherein the suction volume is located in direct proximity to the low-pressure side of the pump.

4. The brake system as claimed in claim 1, wherein the elastic element moves with minimal friction during the admission or delivery of brake fluid.

5. The brake system as claimed in claim 1, wherein the elastic element is formed as a diaphragm or bellows.

6. The brake system as claimed in claim 1, wherein the brake fluid reservoir is connected to the pump by way of a further communicating connecting line.

7. The brake system as claimed in claim 6, wherein the further communicating connecting line is selected from the group consisting of a hose, a plastic line and/or a pipeline, the further communicating connecting line comprises a larger inside diameter than the inside diameter of the other hydraulic lines of the first hydraulic unit.

8. The brake system as claimed in claim 1, wherein the suction volume is at least partially integrated into a hydraulic control unit assembly.

9. The brake system as claimed in claim 1, further comprising an isolating valve, wherein an analog pressure regulating valve is located between the suction side of the pump and the side of the isolating valve facing the brake devices.

10. The brake system as recited in claim 1 wherein the elastic element comprises a metal layer and an elastic layer.

* * * * *